(12) United States Patent
Kurth et al.

(10) Patent No.: US 8,186,225 B2
(45) Date of Patent: May 29, 2012

(54) MEMS VACUUM SENSOR BASED ON THE FRICTION PRINCIPLE

(75) Inventors: Steffen Kurth, Thalheim (DE); Dirk Tenholte, Chemnitz (DE); Karla Hiller, Loessnitz (DE); Christian Kaufmann, Burgstaedt (DE); Thomas Gessner, Chemnitz (DE); Wolfram Doetzel, Chemnitz (DE)

(73) Assignees: Fraunhofer-Gesellschaft zur Foerderung der Angewandten Forschung E.V., Munich (DE); Technische Univeristaet Chemnitz, Chemnitz (DE)

( * ) Notice: Subject to any disclaimer, the term of this patent is extended or adjusted under 35 U.S.C. 154(b) by 553 days.

(21) Appl. No.: 12/301,874

(22) PCT Filed: May 9, 2007

(86) PCT No.: PCT/EP2007/004078
§ 371 (c)(1),
(2), (4) Date: Feb. 4, 2009

(87) PCT Pub. No.: WO2007/134714
PCT Pub. Date: Nov. 29, 2007

(65) Prior Publication Data
US 2010/0024562 A1 Feb. 4, 2010

(30) Foreign Application Priority Data
May 24, 2006 (DE) .......... 10 2006 024 381

(51) Int. Cl.
*G01L 11/00* (2006.01)
(52) U.S. Cl. ............... 73/702; 73/715; 73/753

(58) Field of Classification Search .......... None
See application file for complete search history.

(56) References Cited

U.S. PATENT DOCUMENTS
5,528,939 A 6/1996 Martin
(Continued)

FOREIGN PATENT DOCUMENTS
DE 43 00 893 A1 6/1994
EP 0 735 354 B1 12/2002
(Continued)

OTHER PUBLICATIONS
Abstract of JP 61-231423 (Oct. 15, 1986).

*Primary Examiner* — Lisa Caputo
*Assistant Examiner* — Jermaine Jenkins
(74) *Attorney, Agent, or Firm* — Greenblum & Bernstein, P.L.C.

(57) ABSTRACT

The invention relates to a sensor element for pressure measurement, having a substrate (5) and at least one mass element (1), which is arranged spaced apart from the substrate (5) and is connected in an oscillating manner to the substrate (5) and/or a support body (6) fixed relative to the substrate (5), so that a gap is formed between the mass element (1) and the substrate (5), the width of which can be varied through oscillations of the mass element (1). At least one recess and/or at least one bushing (4) is located in the surface of the substrate (5) delimiting the gap, which recess is used for reducing the damping of the oscillation of the mass element through the gas or plasma surrounding the mass element (1). The sensor element is used in particular in pressure sensors for measuring pressures in the vacuum range. Through the use of the sensor element according to the invention as a pressure sensor, maximum pressures up to the range of atmospheric air pressure can be recorded. The lowest pressures to be determined are in the range of $10^{-6}$ mbar.

27 Claims, 3 Drawing Sheets

U.S. PATENT DOCUMENTS 5,939,635 A     8/1999   Martin
6,389,898 B1 *   5/2002   Seidel et al. ................ 73/514.29
7,047,810 B2 *   5/2006   Kogan et al. .................... 73/702

FOREIGN PATENT DOCUMENTS

JP     61-231 423 A     10/1986
JP     61-231423     11/1986
WO     02/04911 A1     1/2002

* cited by examiner

MEMS VACUUM SENSOR BASED ON THE FRICTION PRINCIPLE

CROSS-REFERENCE TO RELATED APPLICATIONS

The present application is a U.S. National Stage of International Patent Application No. PCT/EP2007/004078 filed Jan. 9, 2007, and claims priority of German Patent Application No. 10 2006 024 381.1 filed May 24, 2006. Moreover, the disclosure of International Patent Application No. PCT/EP2007/004078 is expressly incorporated by reference herein in its entirety.

BACKGROUND OF THE INVENTION

1. Field of the Invention

The present invention relates to a sensor element, and in particular, to a sensor element with which particular pressures in the vacuum range can be measured.

2. Discussion of Background Information

The measurement of vacuum pressures plays a growing role in technology, particularly in high technology, where process control under vacuum has become very widespread. Examples where this type of process control is applicable include: material coating and material quenching and tempering, semiconductor technology, and the food industry.

For measuring low pressures, particularly in the vacuum range, different measuring principles and structures are used. A group of vacuum sensors utilizes the pressure dependence of the damping properties of gases for determining pressure. Sensors of this type are called friction vacuum gauges.

A first moving body located in the vacuum to be measured is typical for all friction vacuum gauges. A second moving or fixed body is usually attached thereto in the immediate vicinity so that a narrow gap is formed between the two. Due to various damping effects, the movement of the first body is damped, wherein the damping is pressure dependent. The detection of the damping can then take place in different ways.

For example, the Spinning Rotor Gauge (SRG) is commercially available from MKS Instruments, Inc. With this friction vacuum gauge the time is measured in which a ball held magnetically in a horizontal plane and rotating about a perpendicular axis is decelerated from an initial speed to a fixed final speed by the gas molecules surrounding it and colliding with it. This time is a measure of the pressure to be measured. The disadvantage of this friction vacuum gauge is that it is a complex arrangement susceptible to faults, has relatively large dimensions and has maximum measurable pressure values of 1 mbar.

WO 02/04911 teaches a friction vacuum gauge in the form of a tuning fork. Compared to other embodiments, such as, e.g., a seismic mass suspended in an oscillating manner, as shown in DE 430 09 893, the arrangement of the oscillator results in low energy transmission or energy discharge to the support body of the oscillator and thus a pressure range expanded to lower pressures of $10^{-3}$ to 100 mbar. Despite this measure, the measurable pressure range is not satisfactory.

According to EP 0735354, expansion of the measuring range can be achieved by the arrangement of two separate sensors or one sensor that utilizes two orthogonal oscillation modes for, respectively, one lower pressure range from $1.33 \times 10^{-6}$ to $1.33 \times 10^{-2}$ mbar, and one higher pressure range from $1.33 \times 10^{-3}$ to $1.33 \times 10^{3}$ mbar. With both arrangements the signals must be evaluated by either two sensors or two modes, which require a complex evaluation electronics system.

SUMMARY OF THE INVENTION

The present invention is therefore directed to overcome the disadvantages of the prior art and to provide a vacuum pressure sensor that is designed to ensure the largest possible measuring range with high resolution and precision over the entire measuring range.

According to the present invention, the object is attained with a sensor element according to claim 1. Claim 24 discloses a method for measuring the pressure with the sensor element according to the invention.

The sensor element according to the present invention is suitable in particular for measuring pressures in the vacuum range and has a substrate and at least one mass element that is arranged spaced apart from the substrate and is connected elastically to the substrate and/or a support body that is fixed relative to the substrate. The gap resulting from the arrangement between the mass element and the substrate can be varied in terms of its width by oscillations of the mass element. At least one recess and/or at least one bushing is provided in the surface of the substrate delimiting the gap. The recess is suitable for reducing the damping of the oscillation of the mass element through the gas or plasma surrounding the mass element.

At higher pressures up to atmospheric air pressure, the squeeze effect is the actual pressure-dependent variable. The squeeze effect is produced by displacement and compression of the air in narrow gaps between plates moving toward one another with large lateral extensions. The squeeze effect is composed of two components, squeeze stiffness (an additional spring constant due to the squeeze effect) and squeeze damping. In order to achieve a pressure dependence of this squeeze effect up to atmospheric air pressure, small gap widths, usually in the μm range, are necessary. With low pressures in the vacuum range, the molecular damping (collisions of gas molecules with the moving or oscillating mass element) is the dominant pressure-dependent effect. This damping effect is more pronounced the larger the surface perpendicular to the direction of movement of the oscillating mass element is. This leads to the problem that the large surface of the mass element necessary for measurement at low pressures in connection with the small gap width required for higher pressures increases the damping so much that the oscillation quality of the oscillating mass element is so low, in particular at higher pressures, that an evaluation of the free oscillation is impossible. The oscillation quality, or quality factor, is a measure of the damping and results from the quotient of initial energy and energy loss per oscillation period, wherein the quotient is multiplied by $2\pi$.

For this reason with the sensor element according to the invention, at least one recess and/or bushing is provided in the substrate surface delimiting the gap. The recess reduces the damping, in particular at high pressures, so that oscillation qualities greater than one (and preferably greater than 10) can be achieved up to maximum pressures in the range of atmospheric air pressure.

In particular, in the determination of the damping or of the pressure from the time sequence of a free mass element oscillating in a damped manner after previous deflection, that is determination from the decay function of a free damped oscillation, a minimum number of oscillation periods or amplitude extrema to be evaluated (and thus a certain minimum oscillation quality) is necessary to ensure satisfactory precision.

With oscillation qualities of less than one, this condition is no longer met. The determination of the damping, and thus of the pressure, then, has to be realized via other detection methods. For example, pressure-dependent damping can be detected in that the amplitude of an excitation signal that is stable in frequency is measured and regulated such that the displacement amplitude of the oscillating mass element remains constant over the pressure range. The pressure-proportional amplitude of the excitation signal is then a measure of the pressure. If it is taken into account that, with the sensor described here, the excitation signal per decade of pressure change can likewise change by approximately one decade. This detection method is suitable only for a very limited pressure range.

With increasing oscillation quality, more measurable values are available, whereby the influence of stochastic signals on the precision of the pressure measurement can be reduced. With oscillation qualities greater than 10, the maximum possible precision can be almost achieved in practice. Much greater oscillation qualities render possible only a slightly higher precision, which is why the measurement can already be terminated before the complete decay of the oscillation.

In a preferred embodiment of the sensor element according to the invention, at least one mass element is embodied in a perforated manner. In particular, in the areas of the mass element that lie directly above the edges of the recesses or bushings, a targeted perforation is advantageous. The influence of production-related geometric tolerances of the recesses or bushings on the damping can thus be minimized.

The width of the gap between substrate and mass element is preferably less than 20 μm, particularly preferably less than 10 μm. The pressure-dependent squeeze effect can thus also be utilized at higher pressures and the measuring range can be extended up to atmospheric air pressure.

In order to be able to detect the lowest possible pressures, the damping surface of the oscillating mass element should be as large as possible. In this respect, a plate-like embodiment of the mass element is particularly expedient. In this context "plate-like" means that the lateral dimensions of the mass element or the surfaces of the mass element chiefly responsible for the damping are sized much larger than the orthogonal dimensions thereto. In order to save mass, and thus material, the orthogonal dimensions are generally minimized such that the plate-like mass element is sufficiently rigid so that the excited and desired oscillation mode (operating mode) is not influenced by bending oscillations of the mass element.

In an advantageous embodiment, the sensor element according to the invention uses a rotation mode about one of the main axes of inertia of the mass element as the operating mode.

Due to their principle of operation, friction vacuum gauges are more sensitive to external disturbance variables such as shocks and vibrations, which, particularly at low pressures and low damping associated therewith, cause an additional oscillation excitation through the energy applied from outside. The choice of a rotation mode as operating mode is advantageous. In particular through a rotation mode, the axis of rotation of which lies on one of the main axes of inertia, disturbance variables of this type can be minimized since forces impressed from the outside lead only conditionally to a momentum effect and, thus, to a disturbance of the excited oscillation. Furthermore, through the positioning of the axis of rotation on one of the main axes of inertia, influences through imbalances are avoided.

In the dimensioning of the characteristic frequency of the operating mode, it should be taken into account that interference effects generally lie in the low-frequency range. In order to make it more difficult for these interfering effects to be injected, the characteristic frequency of the operating mode should be set at as high a frequency as possible. Furthermore, in the determination of the damping or of the pressure from the decay function of the oscillating mass element, more evaluable oscillation periods fall within a time interval through a higher characteristic frequency of the operating mode. However, on the other hand, a much higher characteristic frequency entails a more rigid suspension and would require a greater force and, thus, generally, a higher electric voltage to deflect the mass element.

As a compromise, a suitable range for the characteristic frequency of the operating mode results between approximately 1 kHz and 10 kHz, and preferably between 2 kHz and 2.5 kHz.

In a particularly preferred embodiment, the characteristic frequency of the operating mode is 2.2 kHz.

As a rule, the operating mode is the first, i.e., the lowest, frequency oscillation mode in order to prevent disturbance insertion via lower frequency oscillation modes. Furthermore, the characteristic frequency of the higher frequency oscillation mode following the operating mode is ideally at least ten times the characteristic frequency of the operating mode. Through this difference in frequency, disturbance insertion via higher frequency oscillation modes is also reduced.

Particularly suitable as operating mode are rotation modes with which the suspension elements are loaded only by torsion (torsion modes). An advantageous embodiment of the sensor element according to the invention, therefore, contains a mass element that is attached by two elastic suspension elements lying on a common longitudinal axis and performs an oscillation about the longitudinal axis of the suspension elements. A purely torsional stress of the suspension elements causes the lowest possible energy discharge and, thus, a low internal damping or residual damping of the system. The lower the residual damping and, thus, ratio to the damped component, the lower the pressures that can be measured.

In a further preferred embodiment variant of the sensor element according to the invention, two mass elements are elastically connected to one another, wherein one or both mass elements are in elastic connection with the substrate or a support body fixed relative thereto. Expediently, the one mass element is used to detect the excited oscillation. The other mass element functions as a coupling element through which the mass element determined for detection is mechanically uncoupled from the substrate and/or the support body, and, thus, the energy discharge (internal energy loss) to the substrate and/or the support body via the suspensions or the clamping devices (attaching parts of the suspension elements), is reduced. The energy discharge occurs through stress-induced exchange processes of atoms, by dislocation creep and interactions at grain boundaries and through thermocompression (conversion of mechanical energy into heat by mechanical tensile stress and pressure loading of the crystal lattice), which represents the dominant influence, in particular, with single-crystalline materials (e.g., monocrystalline silicon). These processes represent damping mechanisms, which are responsible for the internal damping or residual damping (damping without external damping influences) of a system. The size of the energy discharge is determined by the material, stress and shape of the structure. Through the use of a coupling element, the energy discharge and thus the residual damping of the system can be reduced and the measuring range can be expanded to lower pressures.

A cascade-connected (nested) centered arrangement of the mass elements lends itself for the most compact possible construction of the sensor element, whereto at least one mass element is embodied in a frame-like manner and another mass element, which is preferably embodied in a plate-like or frame-like manner, is arranged in the interior of the frame.

In a preferred embodiment of the sensor element according to the invention, the first two oscillation modes are rotation modes, which are carried out about a common main axis of inertia of the two mass elements. With one of the two oscillation modes, the two mass elements perform an antiphase oscillation, whereby the energy loss can be minimized at the fixing point, and, thus, in the support body material, and a further optimization of the residual damping of the system can be achieved.

With the use of a rotation mode, in particular a torsion mode, as operating mode, an arrangement in which the two mass elements are connected via two first elastic suspension elements lying on a common longitudinal axis, and these mass elements connected in this manner are elastically connected via two suspension elements, which have a common longitudinal axis with the two first suspension elements, to the substrate and/or a support body fixed relative to the substrate, to minimize the energy discharge through the structurally determined torsional stress of all suspension elements and the use of a coupling element are particularly advantageous.

A particularly suitable material for the sensor element according to the invention is silicon due to its mechanical and electrical properties and its good technical controllability.

The force necessary for the excitation of a mechanical oscillation can be generated in many different ways. Magnetic, piezoelectric or electrostatic effects can be used thereby.

An electrostatic oscillation excitation is preferably used with the sensor element according to the invention. For this, at least one mass element is embodied at least in part in a conductive manner, whereby this mass element can act as an electrode. Through the realization of a further conductive area in the substrate, which is embodied at least in part facing towards the conductive area of the mass element, a counter-electrode can be provided. The advantage of the electrostatic excitation, in addition to the simplicity of the arrangement and the cost advantage associated therewith, is the possibility of being able to use a pair of electrodes simultaneously for the excitation as well as for the detection of the excited oscillation. This can occur, for example, through superimposition of the electric excitation voltage with a higher frequency electric signal that acts as a carrier signal and is modulated through the variation of the capacity between the electrodes due to the oscillation. The excited oscillation can be reconstructed through subsequent demodulation of the carrier signal.

Another advantage of an electrostatic excitation lies in the fact that the electric energy can also be transferred capacitively to the sensor element according to the present invention. An electric through-hole plating into the vacuum is thus superfluous.

The method according to the invention for determining the pressure using the sensor element according to the invention has the following steps:
  Deflection of at least one mass element and generation of a free damped oscillation of this mass element
  Measurement of the time sequence of the oscillation and detection of the extrema of the oscillation amplitude occurring
  Determination of the decay constant from the connection between extrema of the oscillation amplitude and time determined by approximation of the oscillation amplitude values of the extrema
  Determination of the pressure from a known dependence of the decay constant on pressure.

The claimed method uses the sensor element according to the invention and is suitable in particular for determining pressures in the vacuum range. The pressure is thereby determined from the decay function or the decay constant, which is a measure of the damping, of a free damped oscillation.

An oscillating mass element performs a free oscillation when left alone after a deflection it returns oscillating (or, in the case of the critical or supercritical damping, creeping) to the equilibrium state. The frequency of the free oscillation is the damped characteristic frequency of the oscillating mass element.

Through evaluation of the decay function, the damping can also be reliably determined with very low pressures and high oscillating qualities of the oscillating mass element associated therewith, since a quality-related delay time, in practice, has a lower influence with this detection method.

The length of time between change at the system input and the response at the system output is referred to as "delay time." The delay time is the length of time between change at the system input and the completed response at the system output. If, for example, the variable at the system input is changed by a jump function, whereby a value slowly rises at the system output, the delay time is the length of time between the sudden change in the input variable and the end of the rise in the output variable. With detection of the damping or of the pressure through regulation of the frequency of the excitation signal, so that the body is always excited on its pressure-dependent resonance frequency, the delay time has a not inconsiderable influence in particular with low pressures. With this detection method, the excitation frequency is a measure of the pressure to be determined. With low pressures and high oscillation qualities associated therewith, the system reacts extremely sluggishly or with a marked delay to changes in the excitation signal, which can result in control times of several seconds or a control being virtually impossible. Furthermore, the connection is non-linear, since the resonance frequency is influenced, on the one hand, through the damping, and, on the other hand, through the pressure-dependent squeeze stiffness.

Another advantage of the damping detection through evaluation of the decay function resulting therefrom is that this method is independent of changes of the characteristic frequency or resonance frequency of the oscillating mass element, which, for example, can also be caused by temperature fluctuations.

In a first step of the claimed method, the oscillating suspended mass element of the sensor element is deflected electrostatically, for example, through the application of an electric voltage (excitation signal). The excitation signal is thereby optimized in that the mass element reaches a stable rest position (initial deflection) after the shortest time possible without a characteristic frequency of the oscillating mass element being excited. The leading edge of the excitation signal can follow the course of a $\sin^2$ function, for example, and extends over a time interval that lies in the range of 20 times to 30 times the oscillation period of the first characteristic frequency of the oscillating mass element. An overshoot in approaching the rest position can thus be minimized or prevented.

The initial deflection should be as large as possible in order to ensure the largest possible measuring signal. However, the mass element striking the substrate and a possible destruction of the sensor element associated therewith, e.g., by high short-circuit currents, should be avoided. Accordingly, the excitation signal or the electric voltage should be below the value of the pull-in voltage. Pull-in voltage refers to the electric voltage value at which no equilibrium state can be established between electric force and mechanical counterforce of the springs over the possible deflection area, so that the mass element is deflected to the maximum, i.e., until it strikes a limitation.

Starting from the rest position, a free damped oscillation of the mass element is generated through a sudden change in voltage to, e.g., 0 V potential difference between electrode and counter-electrode, which oscillation decreases in amplitude to differing extents depending on the pressure surrounding the mass element.

In a second step, the time progression of the oscillation is measured or scanned. This detection can be carried out, for example, capacitively or optically. To achieve a high resolution, and, thus, precision, the scanning is carried out with a signal, the frequency of which is at least 20 times the frequency of the excited operating mode. The amplitude values of the oscillation determined through the scanning pass through an algorithm that serves to detect the extrema of the oscillation amplitude occurring.

According to this algorithm, the current measured value is compared to the previous measured value. In addition, there is a variable that describes whether the measuring signal is falling or rising. Assuming that the measuring signal is rising and the current measured value is greater than the previous measured value, the result is that the measuring signal rises further. If the current measured value is less than the previous measured value, the previous measured value describes a maximum. In this case the previous measured value is stored with the associated time. However, the noise of the measuring signal must also be taken into account. This means that a maximum is assumed only when the two measured values differ by a minimum quantity above a noise limit. Otherwise, the current measured value is rejected and the next measured value is compared to the penultimate measured value. Determination of a minimum is carried out in an equivalent manner. The comparison of the measured values is carried out in real time.

The measurement is terminated when the amounts of the extrema fall below a certain threshold value, or when a fixed length of time is exceeded. By taking into account all oscillation extrema occurring during the measurement, high measurement accuracy can be achieved over the entire measuring range.

In a further process step, the decay constant is determined from the determined extrema of the oscillation amplitude. Typically, the natural logarithm is thereby formed from the amount of the extrema. These logarithmic values ideally lie on a straight line in the representation over time, which is why the general equation of a straight line serves as a departure for an analytical description of this connection. The "least error sum of the squares method" is used in order to adapt the approximation straight line to the measured values as well as possible. According to this method, the deviations from the measured values from the approximation straight line are weighted differently, so that larger deviations have more influence on the approximation than slight deviations. Two equations result from this approximation method. One of these equations makes it possible to calculate the straight line rise that corresponds to the damping or decay constant sought. To determine the straight line rising slope or the decay constant, in the corresponding equation, five (5) sum terms are applied against one another. These sum terms are calculated from the logarithmic values and the associated time values. Each further determined extremum increases the continuous index of the sum terms by one. For the calculation of the decay constant, accordingly, only the values of the five (5) sum terms are saved and not all of the recorded extrema with the associated time values, which reduces the memory capacity required, thereby reducing costs.

In a final process step, the pressure value to be measured is determined from the determined decay constant and a known dependence on pressure, e.g., a previously determined calibration curve.

Preferably, the sensor element according to the invention is used as a pressure sensor for pressures from $1 \times 10^{-6}$ mbar to $1 \times 10^3$ mbar. Measuring errors of less than 5% of the displayed value can be achieved with a pressure sensor based thereon, whereas 15% is usual according to the prior art.

However, by using a glass substrate and silicon for the mass elements and suspension elements and for the support body and aluminum or gold for the substrate electrodes and feed lines, the sensor element can be operated at working temperatures of up to 350° C. The necessary evaluation and control electronic system is thereby completely replaced and can be embodied such that an electrically conductive connection between sensor element and electronic system of up to one meter in length does not cause any corruption of the measuring signal.

BRIEF DESCRIPTION OF THE DRAWINGS

The invention is described in more detail based on diagrammatic drawings and an exemplary embodiment without loss of generality.

DETAILED DESCRIPTION OF THE EMBODIMENTS OF THE INVENTION

Figure 1:
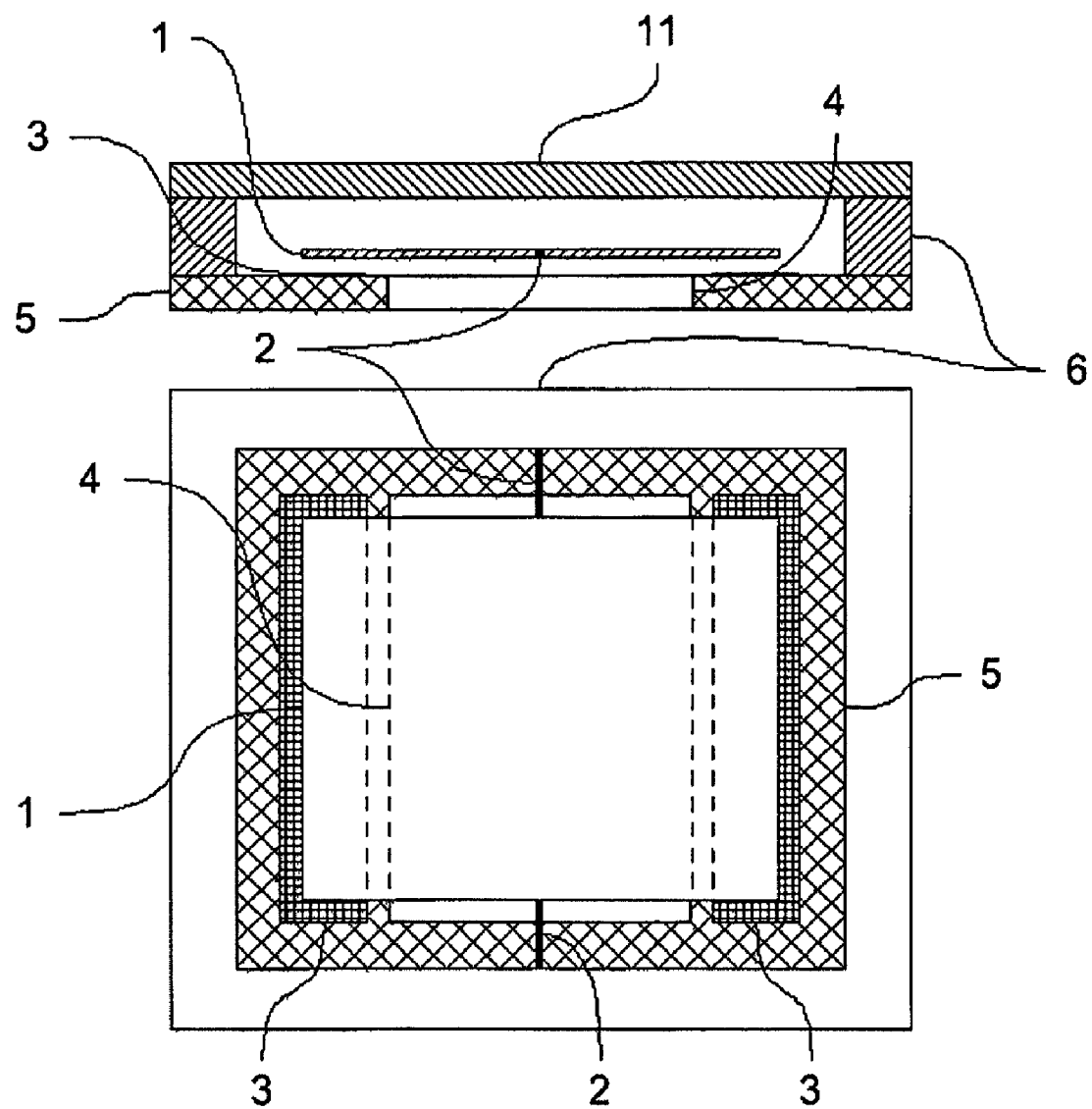
FIG. 1 shows a sensor element according to the invention with a mass element 1 attached to two suspension elements 2.
Figure 2:
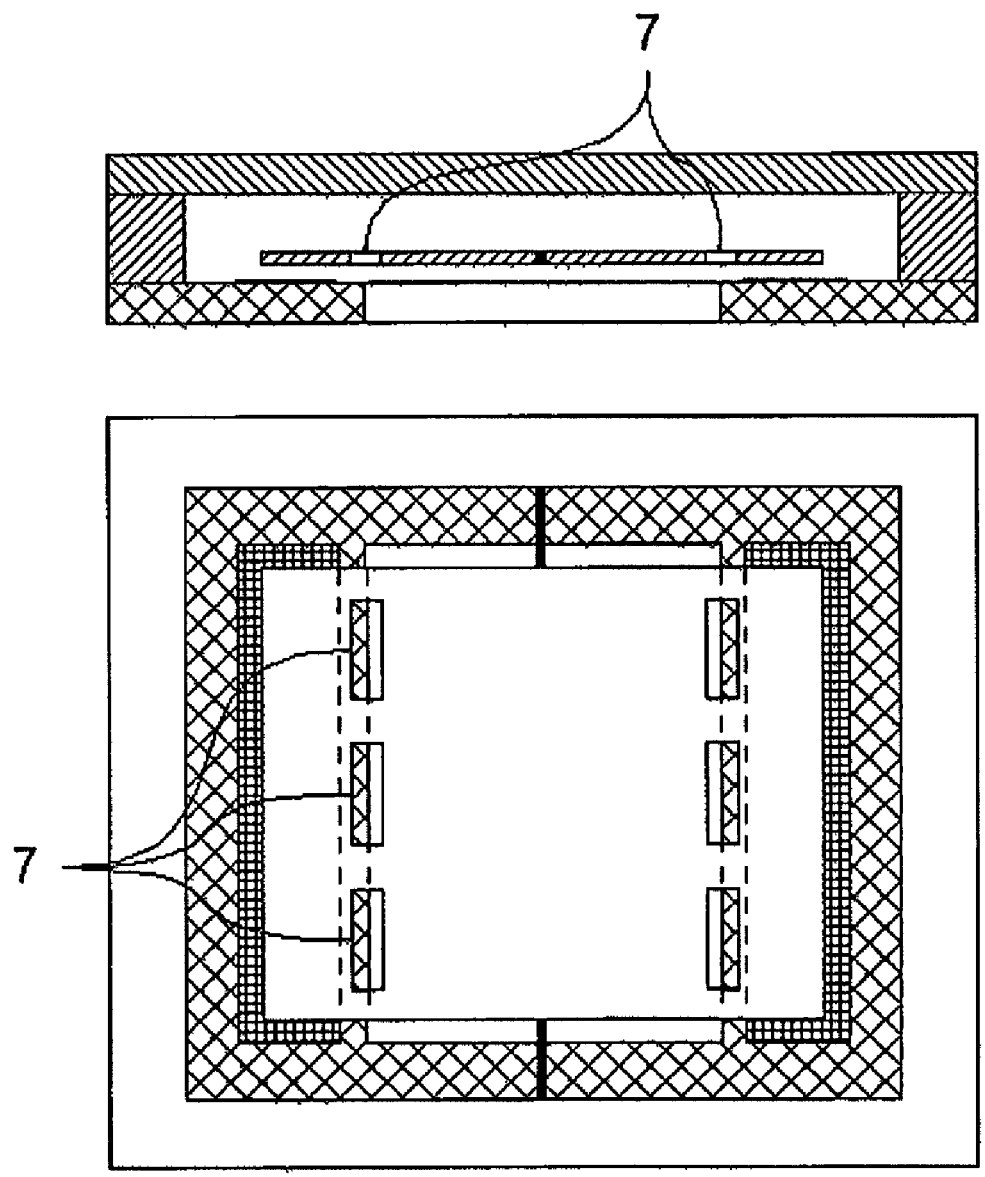
FIG. 2 shows a sensor element according to the invention with perforation 7 of the mass element 1.

FIG. 1 shows a first mass element, e.g., detection mass 1, first suspension elements 2, substrate electrodes 3 for excitation and/or detection, bushing or recess 4 formed in substrate 5, a support body 6, and a cover 11. The sensor element according to the invention shown in FIG. 1 comprises a plate-like mass element 1, which is connected via two suspension elements 2 lying opposite one another to a support body 6, which is rigidly connected to a substrate 5. To reduce the damping at higher pressures, and in particular in the range of atmospheric air pressure, a bushing 4 is provided in the substrate 5 under the mass element 1. In order to minimize the influence of production-related geometric tolerances of the recesses or bushings 4 on the damping, the mass element 1 can be embodied in a perforated 7 manner, as shown in FIG. 2.

Figure 3:
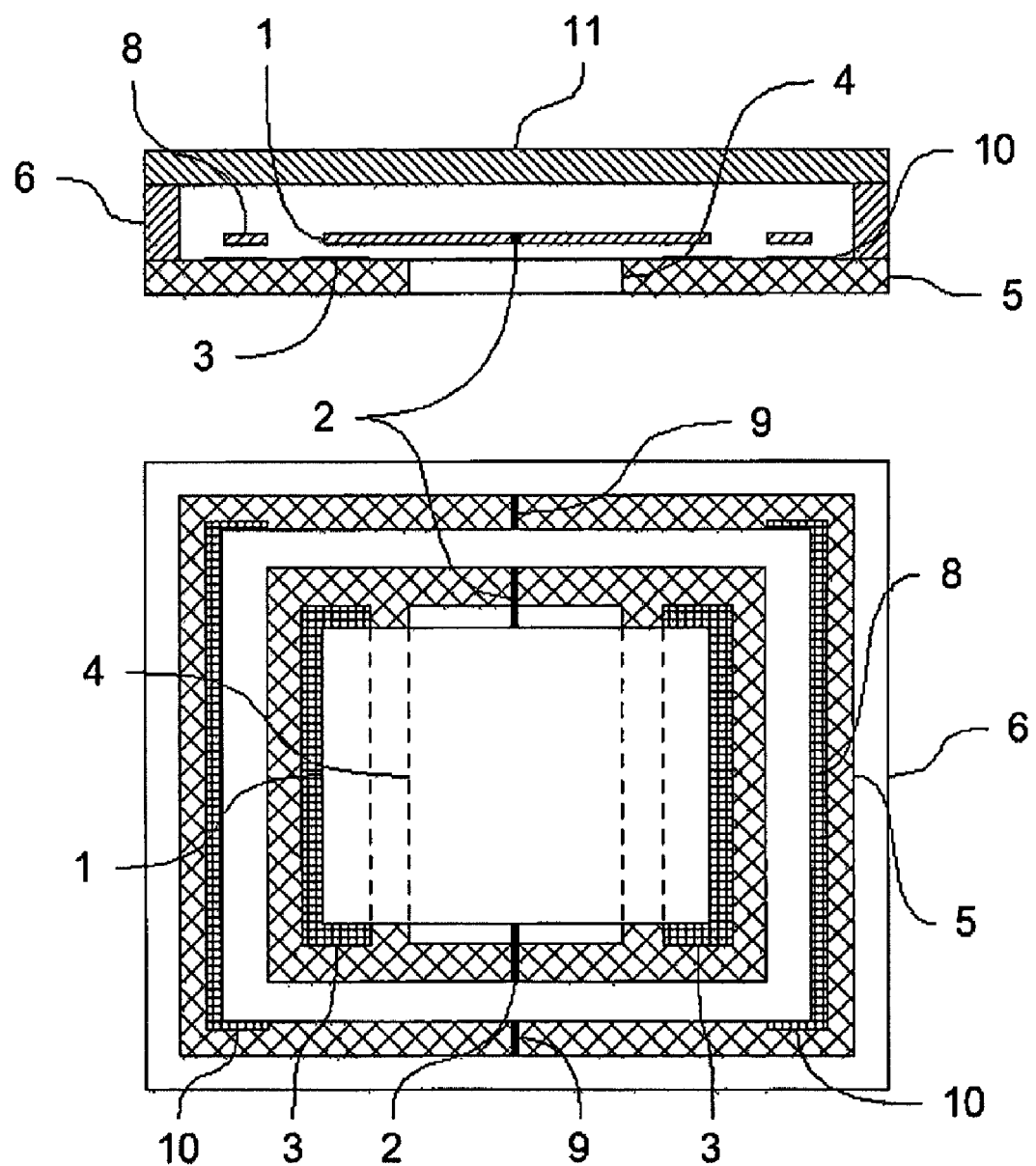
FIG. 3 shows a sensor element according to the invention comprising two mass elements 1, 8 coupled to one another.

FIG. 3 shows, in addition to those features shown in FIG. 1, second suspension elements 9, and substrate electrodes 10, for control. Additionally, FIG. 3 shows a further developed sensor element according to the invention comprising a first frame-like mass element 8 (coupling element—interior dimensions: length 3.76 mm, width 3.2 mm, depth 25 μm,— exterior dimensions: length 5.8 mm, width 5.7 mm, depth 25 μm) and a second plate-like mass element 1 (detection mass: length 2.6 mm, width 2.5 mm, depth 25 μm) arranged centrally inside the frame. The two mass elements 1 and 8 are elastically connected to one another via two first suspension elements 2 (dimensions of a first suspension element: length 500 μm, width 30 μm, depth 25 μm) lying opposite one another, which lie on a common longitudinal axis. The longitudinal axis of the suspension elements 2 is at the same time a common main axis of inertia of the two mass elements 1 and 8. This arrangement is elastically connected to a support body 6 via two further suspension elements 9 (dimensions of a second suspension element: length 250 μm, width 50 μm, depth 25 μm) which have a common longitudinal axis with the two first suspension elements 2. The support body 6, which, like the suspension elements 2 and 9 and mass elements 1 and 8, is composed of silicon, and is in turn connected rigidly to a glass substrate 5.

The suspension elements 2 and 9 are realized by bar-shaped springs. The oscillation (operating mode) excited for measurement is a torsional oscillation about the longitudinal axis of the suspension elements 2 and 9.

The frame-like mass element 8 acts as a coupling element and serves to reduce the energy discharge caused by the suspension of the detection mass 1.

In an exemplary embodiment, the first oscillation mode is a torsonal mode about the longitudinal axis of the suspension elements 2 and 9, in which the two mass elements 1 and 8 move cophasally towards one another. The characteristic frequency of this mode is approximately 1100 Hz. The second (next higher frequency) oscillation mode is likewise a saw-tooth mode about the longitudinal axis of the suspension elements 2 and 9. In contrast to the first oscillation mode, the two mass elements 1 and 8 hereby move toward one another in antiphase at approximately 2200 Hz. A particularly effective coupling to the support body 6 is achieved by this dimensioning.

A bushing 4 (dimensions: length 3.8 mm, width 1.9 mm) through the substrate 5 is located under the detection mass 1 centrally thereto. The bushing serves to reduce the damping at higher pressures, and, in particular, in the range of atmospheric air pressure. This bushing 4 is embodied such that it covers only part of the detection mass 1. The areas of the detection mass 1 not covered are at a distance of 5 μm from the substrate 5 in the non-deflected state.

The silicon of the mass elements 1 and 8, suspension elements 2 and 9, and support body 6 are doped and, thus, embodied, in an electrically conductive manner. Electrically conductive areas of aluminum or gold in the form of substrate electrodes 3 and 10 are arranged on the substrate surface delimiting the gap and facing the two mass elements 1 and 8. The embodiment described provides, respectively, two substrate electrodes 3 and 10 under the detection mass 1 and under the frame-like mass element 8. The substrate electrodes 3 and 10 are thereby arranged such that an action of force, or a torque about the longitudinal axis of the suspension elements 2 and 9, can be generated by the application of an electric voltage between substrate electrodes 3 and 10 and mass elements 1 and 8, which act as counter-electrodes.

The substrate electrodes 3 under the detection mass 1 serve both the excitation as well as the detection of the excited oscillation. The detection thereby takes place through superimposition of the electric excitation signal with a higher frequency electric signal that acts as a carrier signal and is modulated by the variation of the capacity between substrate electrodes 3 and detection mass 1 (counter-electrode) due to the oscillation. The time sequence of the oscillation of the detection mass 1 can be determined by demodulation of the carrier signal.

The substrate electrodes 10 under the frame-like mass element 8 prevent, in particular, a permanent contact in the event that the frame-like mass element 8 touches the substrate 5. Furthermore, these substrate electrodes 10 can be used for fine adjustment or correction of the characteristic frequencies.

LIST OF REFERENCE NUMBERS

1 First mass element, e.g., detection mass
2 First suspension elements
3 Substrate electrodes for excitation and/or detection
4 Bushing or recess
5 Substrate
6 Support body
7 Perforation
8 Second mass element, e.g., coupling element
9 Second suspension elements
10 Substrate electrodes for control
11 Cover

The invention claimed is:

1. A sensor element for pressure measurement, comprising:
   a substrate;
   at least one mass element arranged spaced apart from the substrate and connected in an oscillating manner to at least one of the substrate and a support body fixed relative to the substrate, whereby a gap is formed between the mass element and a surface area of the substrate, and a width of the gap is variable through oscillations of the mass element; and
   at least one of:
      at least one recess; and
      at least one bushing,
   extending into the substrate from the surface area of the substrate that faces the mass element and delimits the gap, for reducing the damping of oscillations of the mass element through a gas or plasma surrounding the at least one mass element.

2. The sensor element according to claim 1, wherein the at least one of the at least one recess and at least one bushing is arranged so an oscillation quality of greater than one is ensured up to maximum pressures in the range of atmospheric air pressure.

3. The sensor element according to claim 2, wherein the at least one of the recess and bushing is embodied such that an oscillation quality of greater than ten is ensured up to maximum pressures in the range of atmospheric air pressure.

4. The sensor element according to claim 1, wherein the at least one mass element is formed in a perforated manner.

5. The sensor element according to claim 1, wherein the width of the gap is less than 20 μm when the at least one mass element is not deflected.

6. The sensor element according to claim 5, wherein the width of the gap is less than 10 μm when the at least one mass element is not deflected.

7. The sensor element according to claim 1, wherein the at least one mass element is embodied in a plate-like manner.

8. The sensor element according to claim 1, further comprising two elastic suspension elements attached to the at least one mass element arranged to lie on a common longitudinal axis.

9. The sensor element according to claim 1, wherein the sensor element comprises silicon or is composed thereof.

10. The sensor element according to claim 1, further comprising at least one substrate electrode arranged on the substrate surface to at least in part face toward the at least one mass element,
   wherein the at least one mass element comprises electrically conductive material, and wherein the at least one substrate electrode is arranged to at least one of electrostatically deflect the mass element by the application of an electric voltage between the at least one of the mass elements and the substrate electrode, and to measure the mechanical oscillation caused by the deflection.

11. The sensor element according to claim 1 being connected to a wall of a container such that energy for exciting the oscillation of the at least one mass element is capacitively transferred via the wall of the container to at least one of the sensor element or the support body.

12. A method of measuring pressure with the sensor element according to claim 1, wherein the pressure sensor measures pressures from $1 \times 10^{-6}$ mbar to $1 \times 10^3$ mbar.

13. A pressure sensor comprising the sensor element according to claim 1, wherein the pressure sensor measures pressures from $1 \times 10^{-6}$ mbar to $1 \times 10^3$ mbar with a measuring error less than 5% of an actual value.

14. A pressure sensor comprising the sensor element according to claim 1, wherein pressure sensor is operable at working temperatures of up to approximately 350° C.

15. A sensor element for pressure measurement, comprising:
a substrate;
at least one mass element arranged spaced apart from the substrate and connected in an oscillating manner to at least one of the substrate and a support body fixed relative to the substrate, whereby a gap is formed between the mass element and a surface of the substrate, and a width of the gap is variable through oscillations of the mass element; and
at least one of:
at least one recess; and
at least one bushing
located in the surface of the substrate for reducing the damping of oscillations of the mass element through a gas or plasma surrounding the at least one mass element,
wherein an operating mode is a rotation mode that is carried out about a main axis of inertia of the at least one mass element.

16. The sensor element according to claim 15, wherein a characteristic frequency of the operating mode is between 1,000 Hz and 10,000 Hz.

17. The sensor element according to claim 16, wherein the characteristic frequency of the operating mode is between 2,000 Hz and 2,500 Hz.

18. The sensor element according to claim 17, wherein the characteristic frequency of the operating mode is approximately 2,200 Hz.

19. The sensor element according to claim 15, wherein a characteristic frequency of a higher frequency oscillation mode following the operating mode is at least ten times the characteristic frequency of the operating mode.

20. The sensor element according to claim 15, wherein the operating mode is a torsion mode.

21. A sensor element for pressure measurement, comprising:
a substrate;
at least one mass element arranged spaced apart from the substrate and connected in an oscillating manner to at least one of the substrate and a support body fixed relative to the substrate, whereby a gap is formed between the mass element and a surface of the substrate, and a width of the gap is variable through oscillations of the mass element; and
at least one of:
at least one recess; and
at least one bushing
located in the surface of the substrate for reducing the damping of oscillation of the mass element through a gas or plasma surrounding the at least one mass element,
wherein the at least one mass element comprises a mass element and at least one further mass element elastically connected to one another, and wherein at least one of the mass element and the further mass element is elastically connected to the at least one of the substrate and support body.

22. The sensor element according to claim 21, wherein one of the mass element and the at least one further mass element detects an excited oscillation and an other of the one of the mass element and the at least one further mass element mechanically decouples the oscillation detecting one of the mass element and the at least one further mass element from the at least one of the substrate and the support body.

23. The sensor element according to claim 22, wherein the at least one further mass element is embodied in a frame-like manner and the mass element is embodied in one of a plate-like or frame-like manner that is arranged within the at least one further mass element.

24. The sensor element according to claim 23 having at least two oscillation modes, wherein a first two oscillation modes are rotation modes about a common main axis of inertia of the mass element and the at least one further mass element, wherein at least one of the two oscillation modes describes an antiphase movement of the mass element and the at least one further mass element that is suitable as an operating mode.

25. The sensor element according to claim 24, wherein the operating mode is a torsion mode.

26. The sensor element according to claim 25, further comprising two first elastic suspension elements lying along a first common axis and two second suspension elements lying on a second common axis,
wherein the mass element and the at least one further mass elements are connected via the two first elastic suspension elements, and
wherein the connected mass element and at least one further mass element are elastically connected to the at least one of the substrate and the support body via two second suspension elements.

27. A method for determining the pressure using a sensor element for pressure measurement that includes a substrate, at least one mass element arranged spaced apart from the substrate and connected in an oscillating manner to at least one of the substrate and a support body fixed relative to the substrate, whereby a gap is formed between the mass element and a surface of the substrate, and a width of the gap is variable through oscillations of the mass element; and at least one of: at least one recess and at least one bushing located in the surface of the substrate for reducing the damping of oscillations of the mass element through a gas or plasma surrounding the at least one mass element., the method comprising:
deflecting at least one of the at least one mass elements to generate a free damped oscillation of the at least one mass element;
measuring a time sequence of the oscillation and detecting an extrema of an amplitude of the oscillation;
determining a decay constant from the connection between the extrema of the oscillation amplitude and a time determined by approximation of oscillation amplitude values of the extrema; and
determining a pressure from a predefined relationship the decay constant on pressure.

* * * * *